(12) United States Patent
Cuypers et al.

(10) Patent No.: US 8,020,344 B2
(45) Date of Patent: Sep. 20, 2011

(54) METHOD OF GROWING PLANTS

(75) Inventors: Jean Marie Wilhelmus Cuypers, Linne (NL); Daan De Kubber, Roermond (NL); Paul Bouwens, Vught (NL)

(73) Assignee: Rockwool International A/S (DK)

( * ) Notice: Subject to any disclaimer, the term of this patent is extended or adjusted under 35 U.S.C. 154(b) by 49 days.

(21) Appl. No.: 12/374,325

(22) PCT Filed: Jul. 20, 2007

(86) PCT No.: PCT/EP2007/006467
§ 371 (c)(1),
(2), (4) Date: Apr. 24, 2009

(87) PCT Pub. No.: WO2008/009461
PCT Pub. Date: Jan. 24, 2008

(65) Prior Publication Data
US 2009/0320361 A1 Dec. 31, 2009

(30) Foreign Application Priority Data
Jul. 20, 2006 (EP) .................................. 06253802

(51) Int. Cl.
*A01G 31/00* (2006.01)
(52) U.S. Cl. .................................................... 47/58.1 R
(58) Field of Classification Search ............... 47/58.1 R
See application file for complete search history.

(56) References Cited

U.S. PATENT DOCUMENTS

| | | | |
|---|---|---|---|
| 3,336,129 A | 8/1967 | Herrett et al. | |
| 4,174,957 A | 11/1979 | Webb et al. | |
| 4,240,817 A | 12/1980 | Takizawa et al. | |
| 4,769,277 A | 9/1988 | Meunier | |
| 5,009,030 A | 4/1991 | Kafka et al. | |
| 5,361,534 A * | 11/1994 | Burns et al. | 47/79 |
| 6,711,850 B2 * | 3/2004 | Yelanich et al. | 47/59 R |
| 2007/0062113 A1 * | 3/2007 | Rubin et al. | 47/59 S |
| 2009/0300981 A1 * | 12/2009 | Cuypers et al. | 47/58.1 R |
| 2009/0300985 A1 * | 12/2009 | Cuypers et al. | 47/1.1 R |
| 2009/0320361 A1 * | 12/2009 | Cuypers et al. | 47/58.1 SC |

FOREIGN PATENT DOCUMENTS

| | | |
|---|---|---|
| CA | 2301248 | 9/2000 |
| DE | 4024727 | 2/1992 |
| DE | 4208733 | 9/1993 |
| EP | 0201426 | 12/1986 |
| EP | 310501 | 4/1989 |
| EP | 313255 | 4/1989 |
| EP | 0485277 | 5/1992 |
| EP | 889175 | 1/1999 |
| EP | 1226749 | 7/2002 |
| EP | 1226749 A1 * | 7/2002 |
| GB | 1336426 | 11/1973 |
| GB | 2079286 | 1/1982 |
| WO | W08300797 | 3/1983 |
| WO | WO9204824 | 4/1992 |
| WO | WO9603858 | 2/1996 |
| WO | WO9700797 | 1/1997 |
| WO | WO9707664 | 3/1997 |
| WO | WO9938372 | 8/1999 |
| WO | WO 03041487 | 5/2003 |
| WO | W02008009467 | 1/2008 |
| WO | WO2008009461 | 1/2008 |
| WO | WO 2008009462 | 1/2008 |
| WO | WO2008009463 | 1/2008 |

* cited by examiner

*Primary Examiner* — Frank T Palo
(74) *Attorney, Agent, or Firm* — McAndrews, Held & Malloy, Ltd.

(57) ABSTRACT

The invention provides a method of growing at least three plants simultaneously in mineral wool growth substrate, the method comprises positioning the plants for growth in mineral wool growth substrate so that the roots of each plant are positioned in a growth region, and irrigating the plants with irrigation water over a period of at least three days, wherein during the irrigation period at least one water content parameter as measured in the growth regions surrounding the plant roots varies over the set of all growth regions by not more than 45%, and wherein the growth substrate comprises binder and wetting agent, the wetting agent comprising ionic surfactant.

25 Claims, No Drawings

METHOD OF GROWING PLANTS

RELATED APPLICATION

This application is a 371 National Phase filing of International Patent Application Serial No. PCT/EP2007/006467 filed Jul. 20, 2007, which claims priority benefit of EP Patent Application Serial No. 06253802.0 filed Jul. 20, 2006. Both applications are incorporated herein by reference in their entirety.

The invention relates to methods of growing plants using a mineral wool growth substrate. In the method, the mineral wool growth substrate comprises a binder, often a hydrophobic binder, to provide structural integrity, and a wetting agent which provides water handling characteristics. The invention also relates to the use of specific types of wetting agent to provide particular characteristics to a mineral wool growth substrate.

It has been known for many years to grow plants in growth substrates formed from mineral wool. Mineral wool products which are provided as a coherent plug, block, slab or mat generally include a binder, usually an organic binder, in order to provide structural integrity to the product and such binders are commonly hydrophobic once cured. This allows the growth substrate to retain its structure during water irrigation. However, mineral wool products which are to be used as growth substrates must have a capacity to take up and hold water, which is routinely supplied by an irrigation system to the growth substrate, and re-wetting properties. Accordingly, it has been well known for some years to include a wetting agent in mineral wool products which are to be used as growth substrates.

One early example of this is GB-A-1336426, which describes readily wettable mineral wool products suitable for use as growth substrates. To provide structure and shape, the fibres contain a binder such as a phenol formaldehyde resin or urea formaldehyde resin. To provide the required water holding characteristics the product also contains a wetting agent, in an amount of up to 2% by weight based on the mineral wool. General classes of wetting agents are mentioned, such as anionic and cationic wetting agents, but nonionic wetting agents are said to be preferred. Indeed, the preferred wetting agents are said to be alkaryl polyglycol ethers such as Triton CF10 (which is exemplified) and Lissapol N. These are said to be such that their wetting ability is reduced when subject to elevated temperatures, such as 200° C. in the curing oven through which the mineral wool is passed in order to cure the resin binder, but still to give an adequate final wetting ability. Other materials are apparently suggested in the context of mineral wool products which are made by a method which does not involve curing at elevated temperatures. These include lauryl alcohol.

A product is described which contains Triton CF10 as the wetting agent and is said to be used for cultivation experiments but no other details are given.

Subsequent publications, and the commercial field itself, have generally followed this preferred approach. For instance, EP-A-889175, DE-A-4208733, WO92/04824 and DE-A-4024727 all describe systems in which a wetting agent/surfactant is included in the mineral wool substrate. In these cases, the nature of the wetting agent is either unspecified or is stated to be a non-ionic material, as in GB-A-1336426. In commercial practice levels of up to 3% non-ionic surfactant are normally used.

Whilst the inclusion of binder and wetting agent as described in GB-A-1336426 is generally very helpful, it has certain problems. The first is that the water handling capabilities of the substrate, although good, show room for improvement. Thus, it would be desirable to provide systems which show improved re-saturation properties (ability of the growth substrate to take up water a second time once it has been wetted then dried), improved water distribution properties (ability of the growth substrate to hold water at a more uniform concentration throughout the height of the growth substrate rather than concentrating at the base), and water retention.

Additionally, one problem which tends to arise with the non-ionic surfactants which have conventionally been used is that they are, during irrigation of the growth substrate, gradually lost from the growth substrate rather than being retained in the mineral wool structure. This means that the wettability properties of the growth substrate gradually decrease over time. This can have an impact on, for instance, the re-saturation properties and also on the water handling properties of a substrate which has been in place for a considerable time, and thus on the performance of the plant and growing process.

Accordingly, there have been other attempts in the art to deal with the problem of providing a mineral wool substrate which contains binder material to provide structural integrity but which also has appropriate wettability properties. Examples include the publications EP-A-889175, DE-A-4208733, WO92/04824 and DE-A-4024727 mentioned above, as well as CA-A-2301248, WO97/07664 and WO99/38372, which address the problem by providing specific binders which can provide both structural and wettability properties. CA-A-2301248 discloses a substrate which additionally comprises surfactant.

These latter two approaches, whilst having advantages, in particular the advantage that the wetting agent is not lost during irrigation, necessitates the use of a rather specific and potentially expensive binder material. Further, there is still room for improvement in their water handling properties.

In particular, it is a constant aim of the growth substrate industry to provide a growth substrate which has improved homogeneity properties in during production and during horticultural use. Production variation, the tendency of commercially used wetting agents to lose, to some extent, their wetting properties during production, in particular in the curing oven, and the tendency of these materials to be lost from the substrate during irrigation, all tend to lead to a substrate whose water handling properties are not identical at all points within its volume. This applies over a large area of growth substrate, including large areas which are made from a number of discrete units, as well as on a smaller scale within the volume of an individual unit. Inhomogeneity can be observed in the width, length and height directions of a produced slab. As a result, inhomogeneity can be observed within a single mass of growth substrate, in the width, length or height direction, or between different masses of growth substrate produced in a single batch, or between different masses produced in different batches.

In commercial greenhouses growers most commonly grow very large numbers of identical plants over the same period, with the intention of providing a large number of finished plants at a predetermined point in the year, and/or to produce the same amount and quality of fruit at a predetermined harvesting time. In order to achieve this it is necessary for very closely controlled growth conditions to be provided to the plants. Close control of the growth conditions is necessary to achieve close control of the plant growth. The aim is to provide a growth substrate which allows the maximum number of plants to be in the optimum state at the predetermined date.

Thus, in use, when a large number of plants are being grown simultaneously, under identical conditions of water supply, a grower usually finds a variation in the water content of the growth substrate across different regions of the greenhouse, and sometimes even within one individual unit of growth substrate, even if this is relatively small in surface area. Accordingly, different plants experience different levels of water in contact with their roots. As water content varies so does EC (electrical conductivity/nutrient level) in the region around the roots of each plant. Additionally pH can vary from plant to plant also.

In order to ensure that as many plants as possible survive and reach the appropriate growth point at the predetermined time, it is then necessary for the grower to provide an irrigation system which ensures that, for instance, the driest parts of the growth substrate are provided with sufficient water to ensure that the plants in those are not lacking water at any time. As a result, other plants, in regions of growth substrate which tends to have a higher water holding capacity, may be subject to amounts of water which are too high for optimum growth, or, even if this is not the case, the amount of water supplied is above the minimum required for at least some of the plants and therefore more is being used than is absolutely necessary.

Accordingly, it is desirable to provide a growth substrate which has greater homogeneity of water properties, including water retention, resaturation and hydraulic conductivity, thus allowing a more robust product and allowing growers to tailor the irrigation regime to the areas which tend to be driest but without increasing the risk of over-watering the plants in wetter parts of the growth substrate and being wasteful of irrigation water and the nutrients and additives it tends to contain.

EP-A-1226749 discloses a process for the production of water-absorbing mineral fibre products, which can be used for growing plants. According to this process, during production of the fibres, material is applied to the fibres after formation and before collection, comprising binder, wetting agent and aliphatic polyol. The binder can be a conventional phenol-based resin. The polyol can preferably be ethylene glycol, propylene glycol or trimethylol propane. The wetting agent can be selected from a long list including salts of higher fatty acids, alkyl or aralkyl sulphates or sulphonates, fatty alcohol sulphates, alkyl phosphates, fatty alcohol ethoxylates, alkyl phenol ethoxylates, fatty amine ethoxylates, fatty acid ethoxylates, alkyl ammonium compounds. Alkyl benzene sulphonate is said to be preferred. No reason is given for this preference.

According to the invention, in a first aspect we provide a method of simultaneously growing at least three plants, all plants being grown in mineral wool growth substrate, the method comprising positioning the plants for growth in mineral wool growth substrate so that the roots of each plant are positioned in a growth region, and irrigating the plants with irrigation water over a period of at least three days, wherein during the irrigation period at least one water content parameter as measured in the growth regions surrounding the plant roots varies over the set of all growth regions by not more than 45%.

This principle is also applicable (in a further aspect of the invention) to other growth region parameters such as pH, electrical conductivity, nutrient level, carbon dioxide content and oxygen content, independently of the water content parameter, or in combination with it. Preferably any or all of these vary in the set of plants by not more than 20% from the median value (percentage based on that median value).

We find that the particular combination of binder and ionic surfactant, especially anionic surfactant, in particular linear alkyl benzene sulphonate surfactant (LAS) provides a surprisingly improved homogeneity of the growth substrate when used. In particular the homogeneity achieved is generally consistently better than a combination of binder and conventional non-ionic based wetting agent. It can even be better in particular respects that the system of the type described in WO99/38372 which uses a specific hydrophilic binder system.

Thus, in the invention, inclusion in the mineral wool growth substrate of ionic surfactant as the wetting agent contributes towards the ability of the substrate to result in homogeneity of water properties (including water retention, resaturation and hydraulic conductivity) within a single unit of growth substrate, between units of growth substrate produced in a single batch, and between separate batches of growth substrate. Accordingly, growers can confidently apply plants to potentially huge areas of the same growth substrate and maintain, over that entire area, a very narrow range of water contents, using the same irrigation system, so that as many plants as possible are maintained at optimum water content, pH and nutrient level, and there is minimal wastage of irrigation water and additives.

Furthermore, the choice of ionic, especially anionic, surfactant, especially LAS, appears to lead to greatly reduced loss of wetting agent during irrigation and consequently minimises foaming problems during the irrigation process. LAS also has the advantage of being aerobically biodegradable in water. Phytotoxicity is low. It also has improved water-holding properties in comparison with conventional non-ionic surfactants.

As a result of this recognition of the beneficial properties of ionic surfactants in particular, we also provide, in a second aspect of the invention, the use of an ionic surfactant to improve the homogeneity characteristics of a mineral wool growth substrate containing binder. Improvement is shown in particular in comparison with growth substrates containing binder and a conventional wetting agent such as non-ionic surfactant. Improvements can also be shown in comparison with mineral wool growth substrates containing a specific hydrophilic binder system such as that described in WO99/38372. Generally the improvement can be shown by replacing the conventional non-ionic surfactant with ionic surfactant as wetting agent, but can also be shown by addition of the ionic surfactant to a conventional system containing non-ionic surfactant.

The growth substrate is formed of mineral wool, which can be glass wool or slag wool but is usually stone wool. In general it can be any of the types of man-made vitreous fibre which are conventionally known for production of growth substrates. Fibre diameter is often in the range 3 to 20 microns, for instance 5 to 10 microns, as conventional.

Density of the growth substrate can be up to 200 kg/m$^3$ but is generally in the range 10 to 150 kg/m$^3$, often in the range 30 to 100 kg/m$^3$, preferably in the range 35 to 90 kg/m$^3$. It can be at least 45 kg/m3.

The mineral wool growth substrate comprises a binder, usually an organic binder, which is generally heat-curable. Each unit of growth substrate is preferably a coherent matrix of mineral fibres connected by cured binder. The invention is particularly valuable when the binder is an organic hydrophobic binder, and in particular when it is a conventional heat-curable (thermosetting), hydrophobic binder of the type which has been used for many years in mineral wool growth substrates (and other mineral wool based products). This has the advantage of convenience and economy. Thus, the binder is preferably a phenol formaldehyde resin or urea formaldehyde resin, in particular phenol urea formaldehyde (PUF) resin.

The binder is generally present in the mineral wool growth substrate in amounts of from 0.1 to 10% based on the substrate, usually 0.5 to 5%, most preferably 1.5 to 5%.

The mineral wool growth substrate also comprises a wetting agent which is an ionic surfactant.

Preferably it is an anionic surfactant. Suitable anionic surfactants include salts (including, for example, sodium, potassium, ammonium and substituted ammonium salts such as mono-, di- and triethanolamine salts) of the anionic sulphate, sulphonate, carboxylate and sarcosinate surfactants. Other anionic surfactants include isethionates such as the acyl isethionates, N-acyl taurates, fatty acid amines of methyl tauride, alkyl succinates and sulfosuccinates, mono esters of sulfosuccinates, di-esters of sulfosuccinates and N-acyl sarcosinates. Preferred are anionic sulphate surfactants and anionic sulphonate surfactants, anionic carboxylate surfactants and anionic soap surfactants.

Particularly preferred are the anionic sulphonate surfactants such as linear or branched alkyl benzene sulphonates, alkyl ester sulphonates, primary or secondary alkyene sulphonates, olefin sulphonates, sulphonated polycarboxylic acids, alkyl glycerol sulphonates, fatty acyl glycerol sulphonates, fatty oleyl glycerol sulphonates and mixtures thereof.

Most preferably the anionic surfactant is a linear alkyl benzene sulphonate in which the alkyl chain has from 5 to 20 carbon atoms. The sodium and potassium salts are preferred. This type of surfactant provides particularly beneficial homogeneity water distribution properties and also provides excellent re-saturation properties and water retention and does not lead to foaming problems in the irrigation water. Conventional non-ionic surfactants allow the growth substrate to take up water but its water retaining capacity is not as good as with the type of surfactant used in the invention.

Preferably the alkyl chain length is in the range 8 to 16, and more preferably at least 90% of the chains are in the range 10 to 13 and more preferably at least 90% (by weight) are in the range 10 to 12.

Alternatively, the ionic surfactant may be cationic or zwitterionic. Examples of cationic surfactants include quaternary ammonium surfactants. These can, for instance, be selected from mono C6 to mono C16, preferably C6 to C10 N-alkyl or alkenyl ammonium surfactants wherein the remaining N positions are substituted by groups such as methyl, hydroxyethyl and hydroxypropyl.

Suitable zwitterionic surfactants include derivatives of secondary and tertiary amines, derivatives of heterocyclic secondary and tertiary amines, or derivatives of quaternary ammonium, quaternary phosphonium or tertiary sulphonium compounds. Betaine and sultaine surfactants are examples of zwitterionic surfactants.

The ionic surfactant is present in the growth substrate in amounts preferably from 0.01 to 3% (by weight), based on growth substrate, more preferably 0.05 to 1%, in particular, 0.075 to 0.5%.

Preferably the amount (by weight) of ionic surfactant based on the weight of binder (dry matter) is in the range 0.01 to 5%, preferably 0.5 to 4%.

It is preferred that there is substantially no other wetting agent than the ionic surfactant, and it is particularly preferred that there is substantially no other wetting agent than linear alkyl benzene sulphonate. Thus, levels of such other materials are preferably below 0.1% (by weight) in particular below 0.01%, based on the growth substrate.

The growth substrate may contain other types of conventional additives in addition to binder and wetting agent, for instance salts such as ammonium sulphate and adhesion promoters such as silanes.

In the method, plants are positioned in mineral wool growth substrate for growth. One plant, or more than one, may be positioned in a single unit of mineral wool growth substrate. The number of plants per unit can be one for rather small units, or rather high for more extensive units. The invention provides improved homogeneity even between units and so is especially valuable where each unit contains a single plant.

The method may be any method of growing plants in a mineral wool substrate. These applications include germination of seedlings, propagation of cuttings, growth of plants in containers, freely planted cultures and sucking beds.

In all cases, it is a particular benefit of the growth substrates defined that they can be re-used. Thus, in the invention it is also possible to position the plants in a mineral wool growth substrate which has previously been used and wetted and allowed to dry out.

The units of growth substrate are each in the form of a coherent mass. The mineral wool growth substrate may be in any integral form, for instance in the form of small blocks or plugs, larger blocks, or an extensive blanket/mat/slab. Dimensions may be selected as convenient. The growth substrate is generally a coherent matrix of mineral wool fibres, which has been produced as such, but can be formed by granulating a slab of mineral wool and consolidating the granulated material.

Each unit of growth substrate may have a variety of height, width and length dimensions, as conventional.

During the method the plants are irrigated with water and nutrients, as is conventional. The use of ionic surfactant has the advantage that loss of the wetting agent to the irrigation water is minimal, allowing for a system in which there is essentially no anti foam material in the irrigation water.

In the method the plants are positioned for growth in the growth substrate. Each plant is positioned so that it roots are in a growth region. If each plant is positioned in a discrete unit of growth substrate then the growth region is that entire discrete unit. Alternatively, there may be a number of plants positioned in a single block/slab/mat of growth substrate. In this case the growth region is the region within that unit around the roots of each individual plant. In any given direction, the growth region extends laterally from the point at which the plant stem emerges from the growth substrate to the midpoint between this point and the point where the stem of the nearest plant emerges from the growth substrate.

In all cases, the growth region extends from the top surface of the growth substrate to its bottom surface.

In the method of the invention, at least three plants are grown simultaneously. The invention is useful where all plants are identical species and at the end of the method the plants or their fruits are harvested at the same time. At the beginning of the method the plants are generally in identical form (eg at identical growth stage).

Often all the plants are grown in a single greenhouse or in a number of greenhouses at a single growing facility (or at separate growing facilities but under the control of a single grower), or outside a greenhouse but in a single growing facility.

Preferably there are at least 50, more preferably at least 200, most preferably at least 1,000 plants.

The growth substrate is usually provided in the form of discrete units, and the invention is of particular value when it is provided as a relatively large number of discrete plugs/ blocks/slabs. Preferably it is provided in the form of at least 10, preferably at least 50, preferably at least 200 discrete plugs/blocks/slabs of mineral wool.

The use of ionic surfactant, as in the invention, means that, even when the set of growth substrate units used in the method is produced as a result of two or more separate production batches, high homogeneity, as evident from the narrow range of water content parameters, is obtained.

In the method, during growth of the plants at least one water content parameter, as measured in the growth regions, is maintained within a narrow range of variation, across the entire set of growth regions. This parameter varies by not more than 45%. The water content parameter (discussed further below) is expressed as a percentage and the values of the minimum and maximum in the entire set of growth regions do not differ from each other by more than 45% during the method. Evidently, the precise growth regions which have the highest and lowest values of the chosen parameter may not be the same regions throughout the method, but at all times the difference between whichever are highest and lowest is not more than 45%.

Preferably the difference is not more than 35%, more preferably not more than 30%, most preferably not more than 25%. It can even be 25% or below, and even 20% or 10% and below. This contrasts with conventional methods using conventional non-ionic surfactants, in which the water content parameters discussed below can vary by 50% across the set of growth regions.

The water content parameter can be: percentage water content at the top of the growth region; percentage water content at the bottom of the growth region; the difference between the percentage water contents at the top and bottom of the growth region; the average water content in the growth region. Each of these parameters is expressed as a percentage. If the chosen parameter is, say, the water content at the top of the growth region, then if the growth region with the lowest water content in the top region has a value of this parameter of, say, 25%, then the growth region with the highest value of this parameter must not have a percentage of more than 70%, and preferably not more than 55%, more preferably not more than 50% (etc).

Preferably at least two of these parameters meet the requirements for low variation across the set of growth regions, more preferably at least three, and most preferably all four.

When the parameter is the difference between the top and bottom water contents, preferably the variation is even narrower, especially not more than 20 or not more than 10%.

Water content parameters are measured at the relevant point using a water content meter. Where the parameter relates to the water content at the top or bottom of a growth region then the water content in the top one-fifth of the region is taken.

According to the invention the homogeneity of water content properties allows the remaining growth conditions to be optimally chosen for the maximum number of plants. Preferably, during the irrigation period at least one growth condition parameter selected from the amount of irrigation water (and hence the amount of the nutrients it contains) supplied per day, the amount of radiation and the temperature is within 30% of the optimum value for all plants in the set (percentage in this case being based on that optimum value). Each plant will have an optimum value of each of these parameters, related to and at least partly determined by the water content and distribution in the growth region housing its roots, and the homogeneity of the growth substrate means that even when identical such growth conditions are supplied to all plants (as is required in an industrial growth environment), no plant is subject to a value of these parameters which is more than 30% (based on the value of the optimum parameter) above or below this optimum.

The method is carried out for at least 3 days. The growth period depends on the plants being grown and their growth phase. The growth period can be at least 2 weeks, eg at least 3 months and can be up to 11 months or longer, sometimes over one year. Thus, for methods of germination the growth period is often 3 to 14 days; for growth in larger blocks it can be from 15 to 110 days; for growth under artificial light it can be 14 to 15 months.

The average water content which the grower aims to achieve usually varies during the growth period. In the start-up phase it is often high, namely 80 to 90%, but then after some weeks is often in the range 50 to 70%. At any one time it is normally somewhere between 30 and 90%, often 40 to 80%, the precise value aimed at by the grower depending upon the growth stage of the plants and the climate conditions.

In use we find that the mineral wool growth substrate exhibits a particularly desirable distribution of water over height. This distribution can be determined by comparing the water content at the top of the substrate with the water content at the bottom of the substrate. Each of these values are usually expressed as percentages and the difference between them is preferably less than 40%, more preferably less than 35% and in particular less than 30%. In preferred cases it can have a negative value, that is, the water content is greater at the top than at the bottom, up to −10%, for instance.

In the method all growth substrates used are intended to be of identical composition. That is, their production parameters are the same. In commercial practice even when production parameters are identical, the use properties of the elements produced exhibit some variation. However, in the invention this variation is reduced in comparison with the products conventionally used, which include non-ionic surfactant as the wetting agent.

The amounts and types of binder, wetting agent and other additives to the mineral wool are nominally the same throughout the growth substrates used in the method. The same applies to the chemical and physical properties of the mineral wool itself.

In a further aspect of the invention we provide a method of growing at least three plants simultaneously in mineral wool growth substrate, the method comprising positioning the plants for growth in mineral wool growth substrate so that the roots of each plant are positioned in a growth region, and irrigating the plants with irrigation water over a period of at least three days, wherein during the irrigation period at least one growth region parameter as measured in the growth regions surrounding the plant roots varies over the set of all growth regions by not more than 20% from the median value of that parameter, based upon the value of that parameter. The growth region parameter is preferably selected from pH, electrical conductivity, nutrient content, carbon dioxide content and oxygen content. In this aspect the growth substrate comprises binder and wetting agent and the wetting agent comprises anionic surfactant.

Thus, the relevant growth region parameter (or parameters) is (are) expressed as a numerical value and the percentage variation is expressed based on the median value of the parameter within the set of growth regions.

In this aspect preferred features of other aspects of the invention discussed above can be applied as appropriate.

The mineral wool growth substrate can be made in conventional manner. That is, it is made by providing solid mineral raw materials, melting these raw materials to form a melt and forming the melt into fibres, collecting the fibres as a primary web and consolidating the collected fibres. A binder is, conventionally, usually added by spraying on to the fibres after formation but before collection and consolidation. In the invention the binder is usually a curable binder and is normally cured as the consolidated product passes through a curing oven. After this the product is cut into the desired sizes.

Curing is normally in an oven at a temperature of around 200° C. or greater, often at least 220° C., for instance in the range of 220 to 260° C. Examples of curing temperatures are 225, 240 and 250° C.

Binder is usually applied to the fibres by spraying of a solution of the binder components in finely divided/atomised form.

The wetting agent is also generally applied to the fibres as an atomised/finely divided spray, usually as a solution or dispersion, but can be in neat form if the wetting agent is itself a liquid.

The wetting agent and binder may be applied to the fibres simultaneously or separately. If they are applied simultaneously, this may be as a result of spraying onto the fibres a single liquid composition which comprises both binder components and wetting agent. Such a composition may, for instance, be produced before transport of the composition to the fibre production facility. Alternatively, the materials may be blended at the fibre production facility. As a further alternative they may be blended in-line just before spraying takes place.

Alternatively, the wetting agent and binder components may be applied separately but simultaneously to the fibres.

In general, application is usually by a spray into the spinning chamber into a cloud of the just-formed fibres. This results in distribution of the wetting agent on the surfaces of the fibres.

One particular advantage of using ionic surfactant, in particular anionic surfactant such as LAS, is that it appears to be stable to the curing conditions to which the growth substrate material is normally subject during production. Thus it can be sprayed onto the fibres together with other additives such as binder. Preferably the ionic surfactant is applied to the fibres after they are formed but before they are collected. This is usually by spraying in the spinning chamber. Alternatively, the ionic surfactant can be applied after the fibres are collected as a primary web and before they are consolidated. It is also possible in some circumstances to apply the ionic surfactant after consolidation but before curing and in some cases the ionic surfactant can be applied even after curing.

The binder usually requires further additives, such as ammonia, ammonium sulphate and silane. These can be added to the binder before transport and storage, or at the fibre production facility before storage, or in-line shortly before spraying on of the binder to the fibres.

It is possible to apply a polyol to the fibres together with the wetting agent, as described in EP-1226749. This polyol, if used, can be blended with the wetting agent before transport and storage, or at the fibre production facility. Preferred polyols are ethylene glycol, propylene glycol, and trimethylol propane, especially ethylene glycol.

The use, in the invention, of anionic surfactant as the wetting agent, together with binder, especially hydrophobic binder, in the growth substrate, can result in improved physical properties such as bending and can at the same time give equivalent firmness to prior known products.

The root behaviour can be improved, in that the number of roots is greater and the finer roots are better branched. There is also often a better root distribution, in that more are present in the top layer.

These properties can be obtained even if the product appears to be wetter.

EXAMPLES

Three growth substrate products were compared, all of height 75 mm. One contains hydrophobic binder and non-ionic surfactant (product A). Another contains a hydrophilic binder and no wetting agent (product B). The third (product C) is a product for use in the invention and contains 3% hydrophobic binder and 0.15% linear alkyl benzene sulphonate anionic surfactant (weight percentages based on growth substrate).

Properties of the products were as follows:

|  | Product A | Product B | Product C |
|---|---|---|---|
| Density (kg/m$^3$) | 46 | 45 | 46 |
| Ignition Loss (%) | 2.8 | 2.6 | 2.8 |
| Initial Saturation (%; V\V) | 83 | 90 | 89 |
| WC-10 cm (%; V\V) | 38 | 67 | 69 |
| Re-Saturation (50%; +5 mm: % V\V) | 58 | 64 | 66 |
| WC Top (%) | 26 | 32 | 30 |
| WC Bottom (%) | 70 | 60 | 59 |
| WC Top-Bottom (%) | 44 | 28 | 29 |

The various properties were measured as follows:

Initial Saturation.

The sample is weighed dry and its dimensions in dry form also measured.

The sample of substrate is saturated with water by putting the sample on the water surface and letting the sample soak itself with water.

When it is lying at the bottom of the water container, the sample is removed gently and is put on a grid for draining.

After 30 minutes of draining the sample with the water is weighed. Based upon the measured weight dry and the measured dimensions of the sample, the initial saturation is calculated on a volume basis.

For each measurement, 5 samples are taken from a batch.

Water Retention.

The method is described in EP-A-310501.

In principle, the samples are saturated with water and are then put on a sand bed. Using as a reference the middle of the sample, the sample is then put via the sand bed on an underpressure of 10 cm water column.

After 4 hours, the sample is taken from the sand bed and weighed. On basis of the measured dry and wet weight and the measured dimensions of the samples, the water content on volume basis is calculated.

Water Distribution Over Height

The samples are saturated with water and then drained until the samples have a total water content of 50%±2%. Then the water content is measured at different heights of the samples with a water content meter.

Re-Saturation.

Samples are saturated with water and then drained until the samples have a total water content of 50%±2%. Then the samples are placed in a container in which the height of the water is 5 mm. After 4 hours the samples are taken out of the container and weighed.

The weight after 4 hours is measured and this result together with the dimensions of the sample gives a water content on volume basis after 4 hours. This is then a measure for the re-saturation capacity.

The product C has improved water properties and can be used in a method of the invention.

The invention claimed is:

1. A method of growing at least 50 plants simultaneously in mineral wool growth substrate, the method comprising:
positioning at least 50 plants of the same species for growth in mineral wool growth substrate comprising binder and wetting agent, the wetting agent comprising ionic surfactant, so that the roots of each plant are positioned in a growth region, and
irrigating the plants with irrigation water over a period of at least three days,
wherein during the irrigation period at least one water content parameter as measured in the growth regions surrounding the plant roots varies over the set of all growth regions by not more than 45%.

2. A method according to claim 1, wherein the wetting agent comprises anionic surfactant.

3. A method according to claim 2, wherein the wetting agent comprises linear alkyl benzene sulfonate anionic surfactant.

4. A method according to claim 1 in which the water content parameter is percentage water content at the top of the growth region.

5. A method according to claim 1 in which the water content parameter is water content at the bottom of the growth region.

6. A method according to claim 1 in which the water content parameter is the difference between the percentage water contents at the top and bottom of the growth region.

7. A method according to claim 1 in which the water content parameter is the average water content in the growth region.

8. A method according to claim 1 in which during the irrigation period at least one growth condition parameter selected from the amount of irrigation water supplied per day, the amount of radiation and the temperature is within 30% of the optimum value for all plants in the set.

9. A method according to claim 8 in which the growth condition parameter is the amount of irrigation water per day.

10. A method according to claim 1 in which the growth substrate is provided in the form of at least 10 discrete units of mineral wool.

11. A method according to claim 1 in which irrigation is applied for at least 14 days.

12. A method of growing at least three plants simultaneously in mineral wool growth substrate, the method comprising:
positioning the plants for growth in mineral wool growth substrate comprising binder and wetting agent so that the roots of each plant are positioned in a growth region, the wetting agent comprising ionic surfactant used in an amount effective to improve the homogeneity properties of the mineral wool growth substrate containing hydrophobic binder; and
irrigating the plants with irrigation water over a period of at least three days.

13. A method of growing at least three plants simultaneously in mineral wool growth substrate, the method comprising:
positioning the plants for growth in mineral wool growth substrate comprising binder and wetting agent, the wetting agent comprising ionic surfactant, so that the roots of each plant are positioned in a growth region,
irrigating the plants with irrigation water over a period of at least three days,
wherein during the irrigation period at least one growth region parameter as measured in the growth regions surrounding the plant roots, selected from pH, electrical conductivity, nutrient content, carbon dioxide content and oxygen content, varies over the set of all growth regions by not more than 20% from the median value of that parameter.

14. A method according to claim 1 in which there are at least 200 plants.

15. A method according to claim 1 in which there are at east 1,000 plants.

16. A method according to claim 1 in which the growth substrate is provided in the form of at least 50 discrete units of mineral wool.

17. A method according to claim 1 in which the growth substrate is provided in the form of at least 200 discrete units of mineral wool.

18. A method according to claim 1 in which irrigation is applied for at least one month.

19. A method according to claim 1 in which irrigation is applied for at least 11 months.

20. A method of growing at least 50 plants of the same species simultaneously in mineral wool growth substrate, the method comprising:
positioning the plants for growth in mineral wool growth substrate comprising binder and wetting agent, the wetting agent comprising linear alkyl benzene sulfonate anionic surfactant, wherein the growth substrate is provided in the form of at least 10 discrete units of mineral wool, so that the roots of each plant are positioned in a growth region, and irrigating the plants with water over a period of at least 14 days, wherein during the irrigation period at least two water content parameters as measured in the growth regions surrounding the plant roots vary over the set of all growth regions by not more than 35%, the at least two water content parameters being selected from the group consisting of (1) percentage water content at the top of the growth region, (2) percentage water content at the bottom of the growth region, (3) the difference between the percentage water contents at the top and bottom of the growth region, and (4) the average water content in the growth region.

21. A method according to claim 20 in which there are at least 200 plants.

22. A method according to claim 20 in which the growth substrate is provided in the form of at least 50 discrete units of mineral wool.

23. A method according to claim 20 in which irrigation is applied for at least one month.

24. A method according to claim 20 in which at least three of the defined water content parameters as measured in the growth regions surrounding the plant roots vary over the set of all growth regions by not more than 35%.

25. A method according to claim 24 in which all four of the defined water content parameters as measured in the growth regions surrounding the plant roots vary over the set of all growth regions by not more than 35%.

* * * * *